G. A. CARDWELL.
TELEGRAPHIC TRANSMITTER.
APPLICATION FILED JAN. 15, 1908.

987,956.

Patented Mar. 28, 1911.
5 SHEETS—SHEET 1.

WITNESSES:

INVENTOR
George A. Cardwell
BY
his ATTORNEYS.

G. A. CARDWELL.
TELEGRAPHIC TRANSMITTER.
APPLICATION FILED JAN. 15, 1908.

987,956.

Patented Mar. 28, 1911.
5 SHEETS—SHEET 2.

WITNESSES:
Leny
M. E. McHinch

INVENTOR
George A. Cardwell
BY
Mastick & Jones
His ATTORNEYS

G. A. CARDWELL.
TELEGRAPHIC TRANSMITTER.
APPLICATION FILED JAN. 15, 1908.
987,956.
Patented Mar. 28, 1911.
5 SHEETS—SHEET 3.
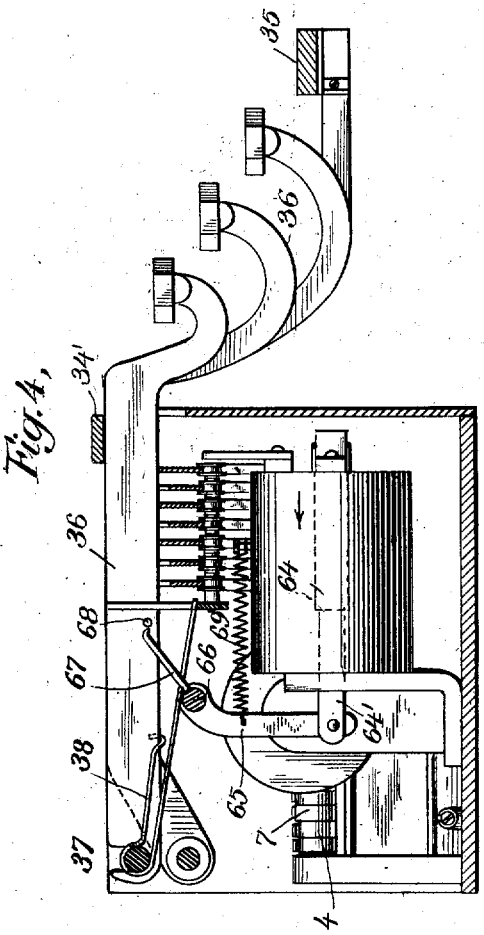
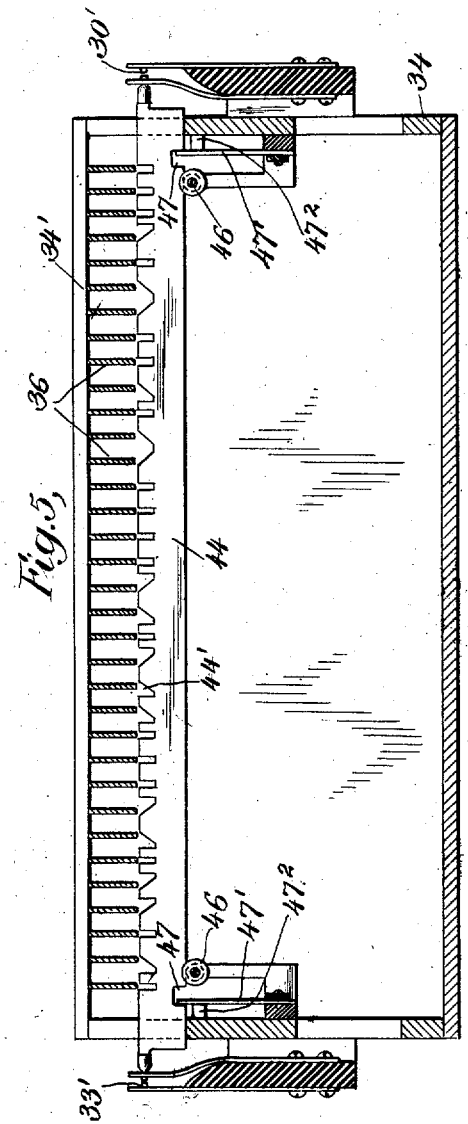
WITNESSES:
D. Levy
M. E. McT___
INVENTOR
George A. Cardwell
BY
Mastick & Jones
his ATTORNEYS.

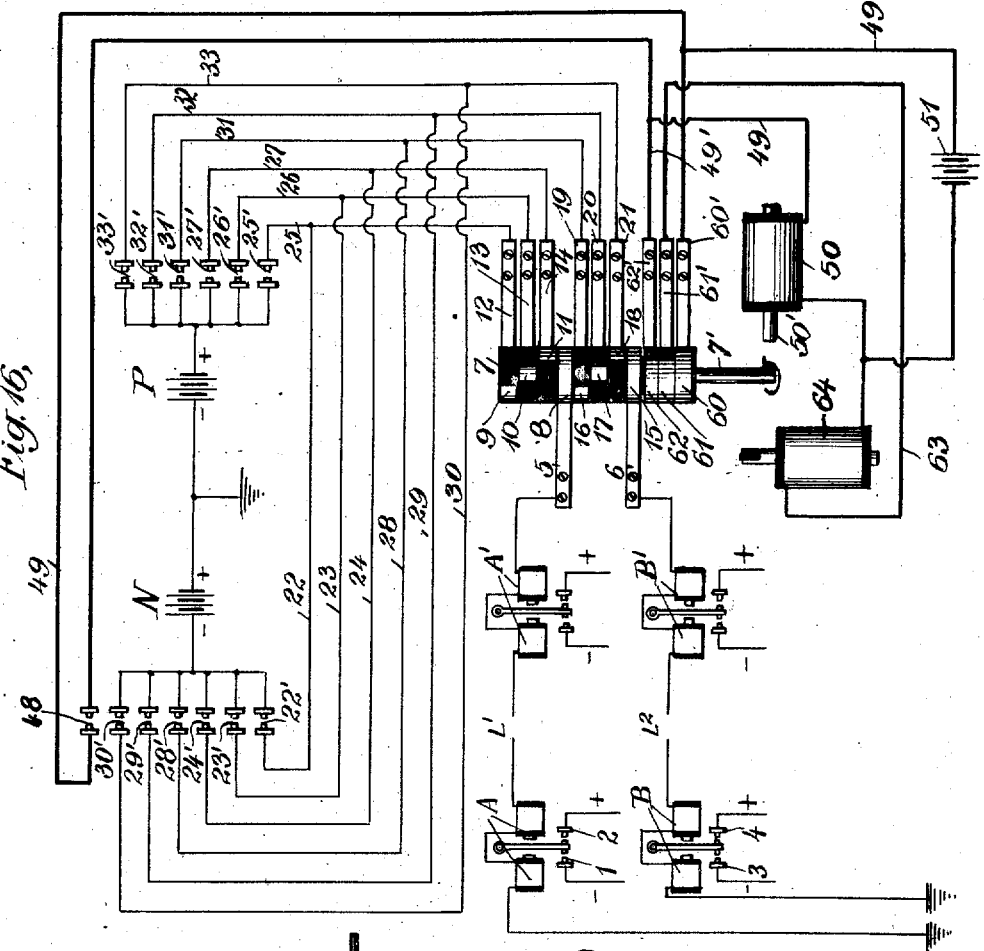

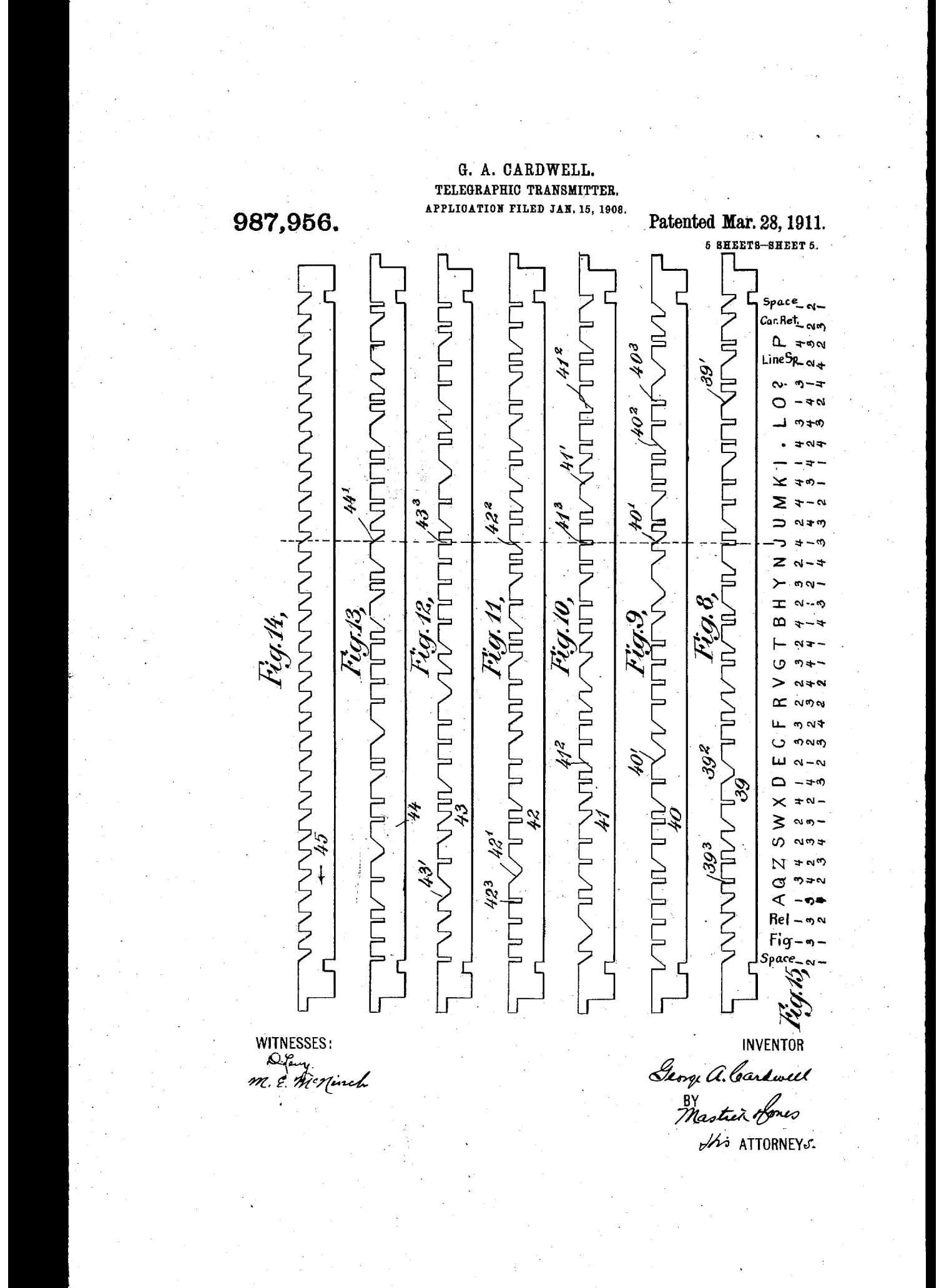

G. A. CARDWELL.
TELEGRAPHIC TRANSMITTER.
APPLICATION FILED JAN. 15, 1908.

987,956.

Patented Mar. 28, 1911.
5 SHEETS—SHEET 5.

WITNESSES:

INVENTOR
George A. Cardwell
BY
Mastin Jones
his ATTORNEYS.

UNITED STATES PATENT OFFICE.

GEORGE A. CARDWELL, OF NEW YORK, N. Y., ASSIGNOR TO AMERICAN TELEGRAPH TYPEWRITER COMPANY, OF NEW YORK, N. Y., A CORPORATION OF DELAWARE.

TELEGRAPHIC TRANSMITTER.

987,956.  Specification of Letters Patent.  Patented Mar. 28, 1911.

Application filed January 15, 1908. Serial No. 410,878.

*To all whom it may concern:*

Be it known that I, GEORGE A. CARDWELL, a citizen of the United States, residing at New York city, in the county of New York and State of New York, have invented certain new and useful Improvements in Telegraphic Transmitters, of which the following is a specification.

In my Patent Number 905,497, granted December 1, 1908, I have described a telegraph typewriter comprising a type wheel the position of which is controlled by a series of electromagnets which are energized in a predetermined sequence for a given letter or other symbol. These magnets are included in circuits which are closed through polarized relays in the line circuit and responsive to currents of different strength or polarity, a given sequence of at least three impulses being required to determine the printing position of any letter. The present invention forming part of the system relates to the mechanism for transmitting the impulses to effect the closing of the circuits at the receiving station, and, generally stated, comprises a keyboard selective mechanism which determines the character of the impulses; a commutator for transmitting the impulses in a predetermined sequence; and mechanism to prevent interference of the impulses.

The invention will be understood by reference to the accompanying drawings in which—

Figure 1:
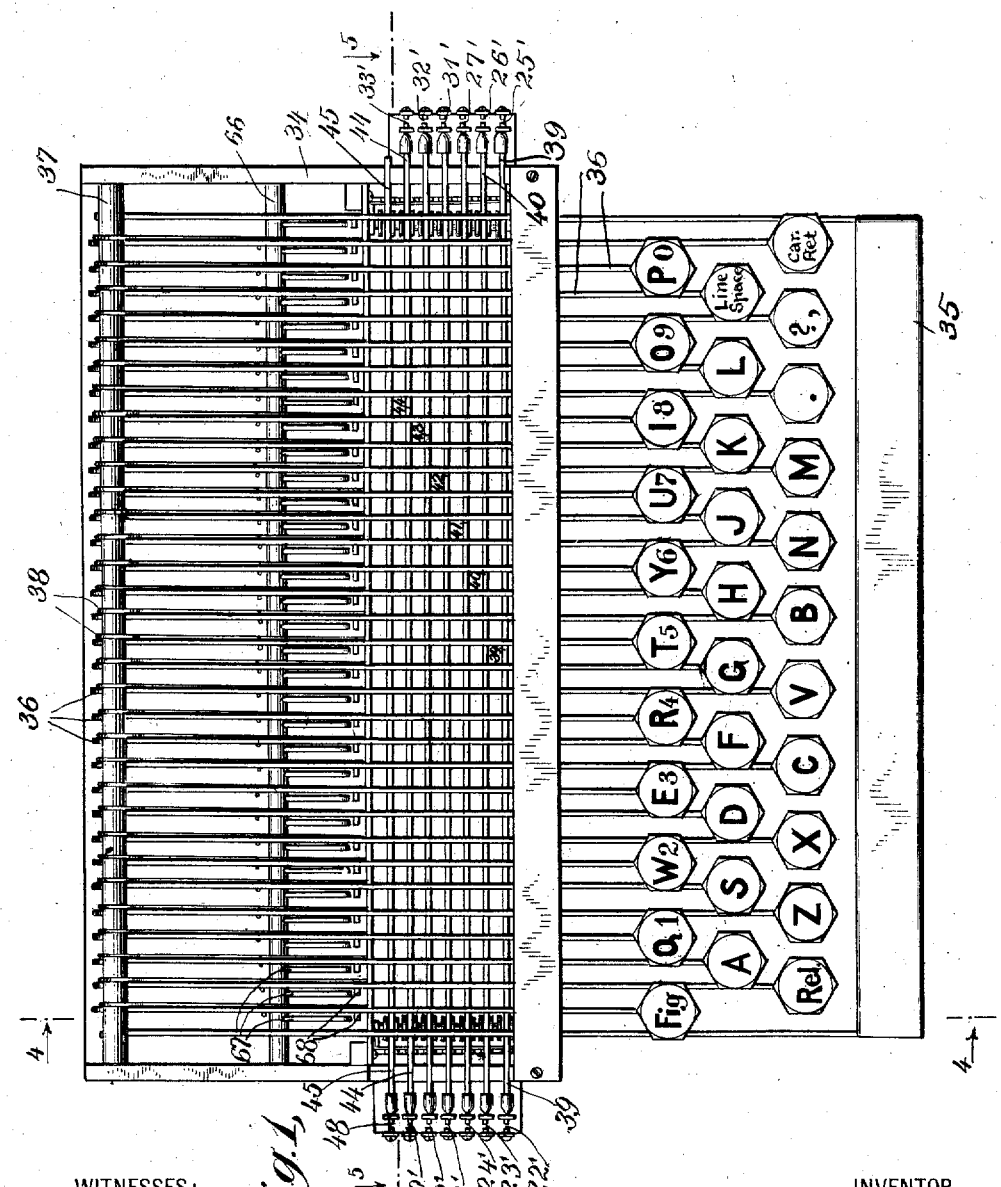
Figure 2:
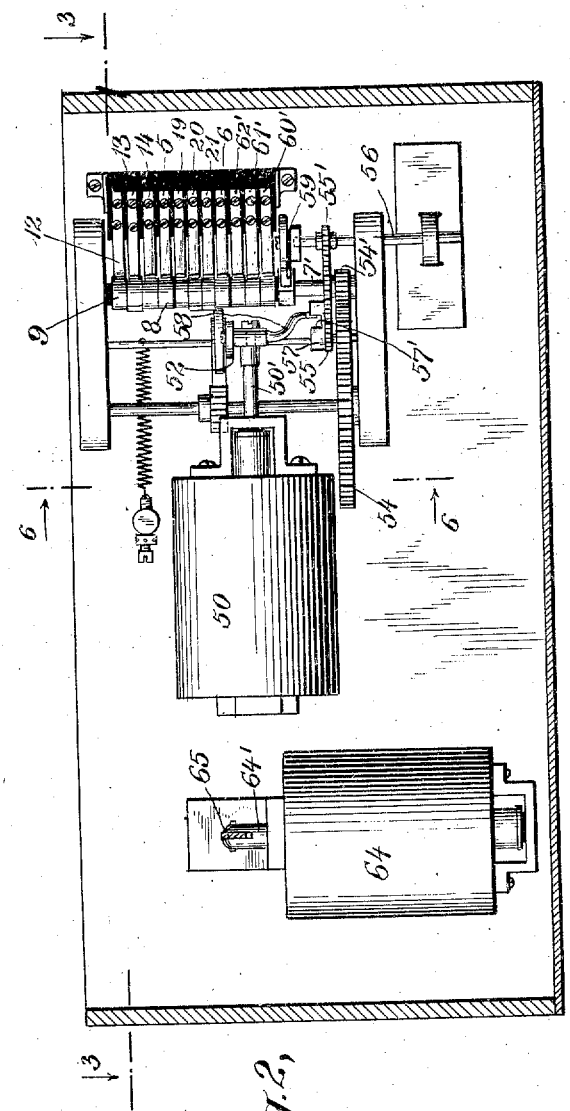
Figure 3:
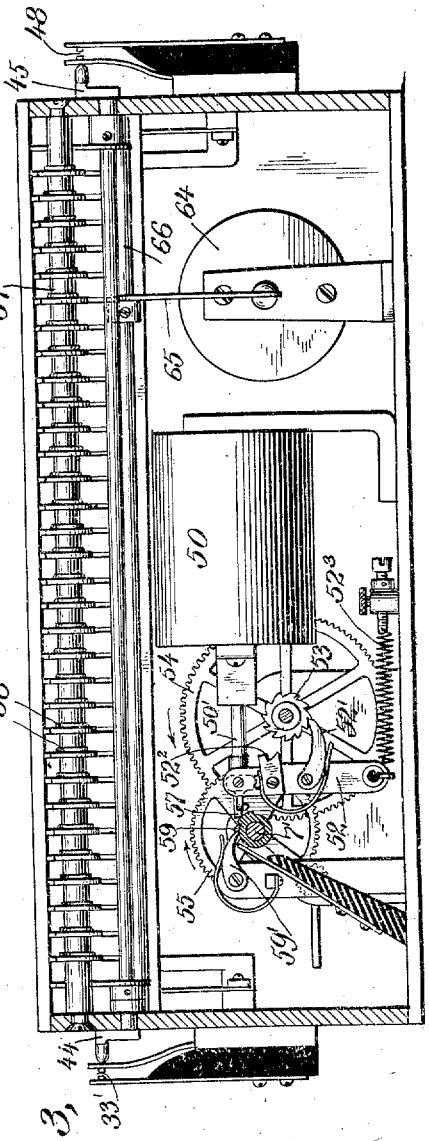

Figure 1 is a top view of the transmitter; Fig. 2 a top view of the locking solenoid and commutator mechanism; Fig. 3 a vertical longitudinal section on the plane of the line 3—3 of Fig. 2; Fig. 4 a transverse vertical section on the plane of the line 4—4 of Fig. 1; Fig. 5 a longitudinal vertical section of the selective mechanism on the plane of the line 5—5 of Fig. 1; Fig. 6 a vertical section on the plane of the line 6—6 of Fig. 2; Fig. 7 a longitudinal section of the commutator; Fig. 14 a side view of a universal bar in the selective mechanism; Figs. 8 to 13 both inclusive side views of the selector bars; Fig. 15 is a table containing the code or system of the order of the impulses for the characters on the keyboard; and Fig. 16 is a general diagrammatic view of the circuits.

Similar reference numerals indicate similar parts in the several views.

Referring more particularly to Fig. 16, L' and L² designate the two line wires from the transmitter to the distant or receiving station. At the latter are polarized relays A and B and at the transmitting station similar relays A' and B' included respectively in lines L' and L². Relay A is adapted to close contact 1 when a negative impulse is sent over line L' and contact 2 when a positive impulse is sent over line L'. Relay B is adapted to close contact 3 when a negative impulse is sent over line L² and contact 4 when a positive impulse is sent over line L².

In order to close the circuits at the receiving station in proper sequence a predetermined code or system of sending in the impulses is essential. In the present system the code adopted by me is given in Fig. 15, the numerals in said code reading vertically downward indicating the sequence of the impulses through the relay contacts 1, 2, 3 and 4. That is, for example, for the letter T the first impulse will be through contact 2, the second impulse through contact 4, and the third impulse through contact 1. It will be noted from this table that the second impulse must come through a different contact from that of the first impulse, and that the third impulse must come through a different contact from that of the second and immediately preceding impulse, but may or may not be through the same as the first impulse in the series. In other words, the first impulse may come through any one of the four relay contacts; the second impulse through any one of the contacts except that through which the first impulse came; and the third through any one of the contacts except that through which the second impulse came. When a given one of the contacts 1, 2, 3 or 4 is closed a circuit will be closed at the receiving station for the purpose of positioning the type wheel and to effect the printing of the characters struck on the keyboard at the transmitting station and for effecting other operations as fully set forth in my said patent.

The line circuits L' and L² are connected respectively to brushes 5 and 6 of a commutator 7, the latter comprising three independent sections, one for local purposes, as hereafter described, and the others for transmitting the impulses in the selected order. The construction of the commutator is shown in Fig. 7. Beginning at the left is a continuous ring 8 of conductive material having an integral sleeve on which are mounted in electrical engagement therewith three segments 9, 10 and 11. These segments have a short projecting portion adapted when the commutator is rotated to contact with brushes 12, 13 and 14 respectively. The intermediate section of the commutator is similar to that just described and comprises a continuous ring 15 of conductive material on which are mounted three segments 16, 17 and 18. The brushes 5 and 6 are in constant electrical engagement with the rings 8 and 15 respectively and it will be readily understood that an impulse, whether negative or positive, through any one of the segments 9, 10 or 11 will be transmitted through ring 8 to line L', and that an impulse, whether negative or positive, through any one of the segments 16, 17 or 18 will be transmitted through ring 15 to line L². These commutator segments are insulated from the shaft as shown in Fig. 7.

Current for operating the relays is supplied by batteries N and P, the former being grounded at its positive side and the latter at its negative side. Battery N is connected with the commutator brushes 12, 13 and 14 through circuits 22, 23 and 24, which circuits include the contacts 22', 23' and 24' respectively. Battery P is connected with the same commutator brushes through circuits 25, 26 and 27, which circuits include the contacts 25', 26' and 27' respectively. Battery N is connected with the commutator brushes 19, 20 and 21 through circuits 28, 29 and 30, which circuits include the contacts 28', 29' and 30' respectively; and battery P is connected with the same brushes through circuits 31, 32 and 33, which circuits include contacts 31', 32' and 33' respectively. It will be seen from this that in order to send a negative impulse over line L' one of the three contacts 22', 23' or 24' must be closed; to send a positive impulse over line L' one of the three contacts 25', 26' or 27' must be closed; to send a negative impulse over line L² one of the three contacts 28', 29' and 30' must be closed; and to send a positive impulse over line L² one of the three contacts 31', 32' and 33' must be closed. The commutator 7 is arranged so as to be rotated in a left-handed direction as viewed in Fig. 16, and the segments 9, 10 and 11 are so arranged that the projections thereon are in step-like formation so that the segment 9 will first make contact with the corresponding brush 12 followed by contact of segment 10 with its brush 13 and segment 11 with its brush 14. The same arrangement of the segments 16, 17 and 18 is observed, said segments contacting with the corresponding brushes 19, 20 and 21 in the order given. As in the present system three impulses at least are required, the first impulse must be sent by closing one of the four contacts 22', 25', 28', or 31', as it will be seen by tracing the circuits in which these contacts are included that they lead either to the brushes 12 or 19. That is, the brush 12 is included in the circuits of the contacts 22' and 25', the former transmitting a negative impulse and the latter a positive impulse; and the brush 19 is included in the circuits of contacts 28' and 31', the former transmitting a negative and the latter a positive impulse. Whatever, therefore, the character of the first impulse, it must be transmitted from brush 12 to the corresponding segment 9, or from brush 19 to the corresponding segment 16, and from thence either to line L' or to line L². In the same way it will be seen that the second impulse must be transmitted through either segment 10 or segment 17 for the reason that the brush 13 of the former is included in the circuits which include contacts 23' and 26', and that brush 20 is included in the circuits which include the contacts 29' and 32', so that the second impulse must come through the closing of one of the four contacts 23', 26', 29' or 32'. In the same manner by tracing the circuits it is seen that the third impulse must come through the closing of one of the four contacts 24', 27', 30', or 33'.

Comparing the arrangement of the contacts 22' to 33' both inclusive with the code given in Fig. 15 it will be seen that the latter indicates not only the sequence of the impulses through the relay contacts 1, 2, 3 or 4, but also the character of the impulses. Thus for the letter D the code indicates that the first impulse will close relay contact 1 which is in line L'. This requires that the circuit shall be closed through segment 9, brush 12 and contact 22' giving a negative impulse; the second impulse must close relay contact 4 which is in line L² and requires that the circuit shall be closed through segment 17, brush 20 and contact 32' giving a positive impulse. The third impulse requires the closing of relay contact 3 which is in line L² requiring the circuit to be closed through segment 18, brush 21 and contact 30' giving a negative impulse. In the same manner the circuits of the successive impulses for any other letter on the keyboard or any operation such as line spacing, carriage return, etc., may be traced.

A convenient manner of regarding the contacts 22' to 33' is to consider them as divided into four groups of three each, the first comprising contacts 22', 23' and 24' adapted when any one of them is closed to send a negative impulse over line L' through the commutator segments 9, 10 and 11 respectively to close relay contact 1 according as to whether it is the first, second or third contact of the series to be closed. The second group comprises contacts 25', 26' and 27' adapted, when any one of them is closed, to send a positive impulse over line L' through commutator segments 9, 10 and 11 respectively to close relay contact 2 according as to whether it is the first, second or third contact of the series to be closed. The third group comprises contacts 28', 29' and 30' adapted, when any one of them is closed, to send a negative impulse over line $L^2$ through the commutator segments 16, 17 and 18 respectively to close relay contact 3 according as to whether it is the first, second or third impulse of the series to be closed. The fourth group comprises contacts 31', 32' and 33' adapted, when any one of them is closed, to send a positive impulse over line $L^2$ through the commutator segments 16, 17 and 18 respectively to close relay contact 4 according as to whether it is the first, second or third contact of the series to be closed. Each of the circuits 22 to 33 may be further considered as normally open at two points; that is, at the breaks 22' to 33' inclusive, and at the commutator, so that the closing of a given break 22' to 33' and the rotation of the armature in a left-handed direction will completely close a given circuit to transmit a characteristic kind of impulse either over line L' or $L^2$. As, for example, to effect the printing of letter J the relay contacts must be closed in the order 4—1—3. As relay contact 4 is closed by a positive impulse over line $L^2$, it is required that circuit 31 shall be closed through contact 31', brush 19 and commutator segment 16. As relay contact 1, the second of the series to be closed, is closed by a negative impulse over line L' it is required that circuit 23 shall be closed through contact 23', brush 13 and commutator segment 10. As relay contact 3, the third of the series to be closed, is closed by a negative impulse over line $L^2$ it is required that circuit 30 shall be closed through contact 30', brush 21 and commutator segment 18. The complete circuits for the transmitting of the required impulses for any other letter or operation may be readily traced by taking the sequence of impulses from Fig. 15.

Instead of grouping the contacts 22' to 33' as above described, they may be considered as divided into three groups of four each as follows. The first group comprises 22', 25', 28' and 31', the closing of any one of which will send the first impulse of the series; the second group comprises contacts 23', 26', 29' and 32', the closing of any one of which will send the second impulse of the series; and the third group comprises contacts 24', 27', 30' and 33', the closing of any one of which will send the third impulse of the series, it being understood, of course, that the rotation of the commutator is necessary to send the impulses.

Having described the several circuits which are closed through the commutator and the contacts 22' to 33', I will now describe the mechanism for closing said contacts. Referring to Figs. 1, 3 and 4, the numeral 34 designates the casing in which the operative parts are assembled. The keyboard contains thirty-two keys, or thirty-three keys including the space bar 35, of which twenty-eight are for printed characters and the remainder for figures, carriage return, etc. The keyboard shown is of the universal type and it is to be understood that any number of keys may be employed. The key levers 36 are pivotally mounted on a rod 37 secured to the casing and are pressed upward in normal position by springs 38 against a plate 34' forming part of the casing. Extending transversely of the key levers is a series of notched bars, seven in number and designated respectively 39, 40, 41, 42, 43, 44 and 45, which are illustrated in detail in Figs. 8 to 14 inclusive. These bars are slidably mounted in openings in the side walls of the casing and rest upon rollers 46 mounted in brackets as shown in Fig. 5, and are provided on the lower edge with notches 47 into which project spring arms 47' to hold the bars in normal position, said springs bearing against stops $47^2$ secured to the casing. The ends of the bars 39 to 45 project beyond the side walls of the casing and are covered with a cap of insulating material. The contacts 22', to 33', as shown in Figs. 1, 3 and 5, are mounted on blocks of insulating material secured to the casing and are placed in juxtaposition with the bars 39 to 44 inclusive so that when a given one of said bars is moved to the right or left one of the twelve contacts will be closed. The desired movement of the selector bars is effected by the key levers when the latter are depressed, and for that purpose the bars are mounted transversely to the key levers and immediately below the latter so that the depression of a key lever in the ordinary manner will engage the bars.

It being necessary to send three impulses to the distant station, at least three of the twelve contacts 22' to 33' must be closed, and to effect this three of the bars 39 to 44 must be moved. The said bars are, therefore, laid out, as shown in Figs. 8 to 13, with a certain number of vertical and inclined cuts or notches, the latter being inclined upward to the left to effect a movement of the bar to the left, and inclined upward to the right to effect a movement of the bar to the right. These bars are so cut and arranged that the bars 39, 40 and 41 when moved to the left will close the contacts 22′, 23′ and 24′ to send a negative impulse over line L′, and when moved to the right will close contacts 25′, 26′ and 27′ to send a positive impulse over line L′; and the bars 42, 43 and 44 when moved to the left will close contacts 28′, 29′ and 30′ to send a negative impulse over line L², and when moved to the right will close contacts 31′, 32′ and 33′ to send a positive impulse over line L². The notches are so disposed, however, that when a given key lever is depressed but three of the six bars will be moved; that is, when a bar is to remain stationary it is cut with a vertical notch into which the key lever passes without imparting any movement to said bar, but when the key lever strikes against the wall of one of the inclined notches the bar will be moved to either the right or the left as above explained. The bars that will be moved for any given letter may be readily found by laying a straight edge across the bars 8 to 13. As, for example, when the key lever of the letter J is depressed it will pass into a vertical notch in the bars 39, 41 and 43 and said bars will, therefore, remain stationary, but will strike against the inclined walls of notch 40′ in bar 40, and 44′ in bar 44, moving both of said bars to the left and closing contacts 23′ and 30′ respectively. It will also strike against the inclined wall of notch 42² of bar 42, moving the latter to the right and closing contact 31′. For the letter O it will be seen that the key lever will pass into vertical notches in the bars 40, 42 and 44, said bars, therefore, remaining stationary. Bar 39 will be moved to the left closing contact 22′, and bars 41 and 43 will be moved to the right closing contacts 27′ and 32′ respectively. For the letter E the bars 39 and 41 will be moved to the right closing contacts 25′ and 27′ respectively, and bar 40 will be moved to the left closing contact 23′. The remaining three bars; namely, 42, 43 and 44, remain stationary. In the same manner the bars moved upon the depression of any of the levers of the keyboard may be readily found.

It being understood that the three bars are moved simultaneously therefore closing the three selected contacts simultaneously, it is necessary to provide mechanism for sending out the impulses successively and in their proper order. This is effected by disposing the commutator segments 9, 10 and 11 in one section, and segments 16, 17 and 18 in the other section, in the step-like formation heretofore described, and as illustrated in Fig. 16. The commutator may, therefore, be regarded as a selective mechanism for completely closing the circuits in a predetermined sequence, breaks in which circuits were closed by the movements of the selector bars. This will be made clear by reference to Fig. 16, taking the same letter J.

When its key lever is depressed the bars 40 and 44 will be moved to the left and 42 will be moved to the right closing respectively contacts 23′, 30′ and 31′. Bearing in mind the grouping of the contacts, it will be seen that contact 31′ is one of the contacts through which the second impulse must come, and that 30′ is one of the contacts through which the first impulse must come; that contact 23′ is one of the contacts through which the third impulse must come. The impulses must, therefore, be sent through the circuits in which are included the contacts 31′, 23′ and 30′ respectively. By tracing the circuits it will be seen that the first impulse will be sent over circuit 31, through brush 19, commutator segment 16, to line L² which will close relay contact 4; the second impulse will be sent over circuit 23, through brush 13, commutator segment 10, to line L′ closing relay contact 1; and the third impulse will be sent over circuit 30, through brush 21, commutator segment 18, to line L² to close relay contact 3. The relay contacts will, therefore, be closed in the order 4—1—3 as required by the table given in Fig. 15.

When the key lever of letter O is depressed contacts 22′, 27′ and 32′ will be closed. The first impulse will, therefore, be sent over circuit 22, brush 12, commutator segment 9, line L′ to close relay contact 1; the second impulse will be sent over circuit 32, through brush 20, commutator segment 17, to line L² to close relay contact 4; and the third impulse will be sent over circuit 27, through brush 14, commutator segment 11 to line L′ to close relay contact 2. In a similar manner the sequence of the circuits completely closed at the commutator may be readily traced. As the space bar 35 has two levers, the bars 39 to 45 are similarly notched at both ends.

There remains to be described the mechanism for rotating the commutator and for preventing interference of impulses. In addition to the selector bars above described there is an additional bar 45 cut throughout with notches inclined in the same direction; that is, upwardly to the left. This is a universal bar and is moved to the left whenever any one of the key levers is depressed. The purpose of said bar is to close a contact 48 included in a circuit 49, which circuit also includes a solenoid coil 50 and battery 51. Connected to the core 50′ of said solenoid is a lever 52 pivotally mounted on a shaft near its lower end. On the side of said lever is pivoted a spring-pressed pawl 52′ which engages the teeth of a ratchet wheel 53 fast on the shaft of a gear wheel 54. The latter meshes with a pinion 54′ on the commutator shaft 7′. Whenever, therefore, a key lever is depressed the bar 45 will be moved to the left closing contact 48 and thereby energizing solenoid 50, the core of which will be drawn inwardly causing the pawl 52' to rotate the ratchet wheel 53 one tooth, thereby rotating the commutator. Meshing with a spur gear 55 on the shaft 7' is a pinion 55' on the shaft 56 of a speed regulator or governor. It is essential that there shall be but a single rotation of the commutator and that it shall be brought to an absolute stop. In order to prevent, therefore, the overthrow of the commutator I attach to the side of spur gear 55 a plate 57 having a notch 57' therein. Normally an arm 58 attached to the pawl carrying lever 52 projects below said plate. As the gear wheel 55 is rotated the plate 57 is so moved that the arm 58 passes through the opening therein and above the plate and acts as a stop against which the plate strikes when the wheel 55 completes one revolution. This brings the commutator to an absolute stop and to prevent rebound a ratchet wheel 59 is keyed on the commutator shaft which wheel is engaged by a back lash pawl 59'. To provide an absolute stop for the gear wheel 54 I secure to the side lever 52 a pawl 52² which engages the back of one of the ratchet teeth 53 when the lever 52 is moved forward. A spring 52³ restores the parts to normal position when the solenoid 50 is deënergized.

When contact 48 is closed by the movement of notched bar 45 solenoid 50 will be immediately energized and the commutator rotated. In order that all of the impulses may be sent, it is necessary that there shall be a complete rotation of the commutator and this can be secured only by maintaining solenoid 50 energized for a sufficient length of time. The operator may hold a given key lever depressed to thereby maintain contact 48 closed, but I do not depend upon this. If a key lever is given a very light touch, although contact 48 would be closed through the movement of the universal bar 45, the return of the key lever to normal position would result in the opening of contact 48 and, solenoid 50 being thus deënergized, the commutator would be given a partial rotation only and the sending of the impulses would be interrupted. In order, therefore, to insure that solenoid 50, after being energized through the closing of contact 48, shall remain energized long enough to effect one complete rotation of the commutator irrespective of whether contact 48 remains closed or is opened after the rotation of the commutator has begun, I construct the commutator with a section comprising a continuous ring 60 similar to the rings 8 and 15, and two segments 61 and 62 (see Figs. 7 and 16). These segments are in constant electrical engagement with each other and with the ring 60 and are insulated from the commutator shaft as shown in Fig. 7. The ring 60 is in constant electrical engagement with a brush 60' and the segments 61 and 62 are adapted, when the commutator is rotated, to engage brushes 61' and 62' respectively. In the normal positions of the parts the brushes 61' and 62' rest upon an insulated section of the commutator. The segments 61 and 62 are of such length that a very slight movement of the commutator is sufficient to bring them into contact with their respective brushes so that when a key lever is depressed sufficiently to close contact 48 solenoid 50 will be immediately energized and the rotation of the commutator will close an auxiliary circuit 49', in which the brush 62' is included, through solenoid 50 and the latter will remain energized to insure the completion of the rotation of the commutator to send in all of the impulses regardless of the condition of contact 48. So far, therefore, as the rotation of the commutator is concerned it is not necessary that a given key lever be held depressed after segment 62 has come in contact with its brush 62'.

In order to prevent any interference of impulses it is essential that when a key lever is depressed it should be locked against return movement and all the other key levers should be locked open; that is, any movement of them prevented, until the impulses necessary for a given letter have been transmitted. To effect this I include brush 61' in a circuit 63 which also includes a magnet in the form of a solenoid coil 64, and battery 51, so that when the commutator is rotated circuit 63 will be closed thereby energizing magnet 64. The core of solenoid 64 has connected thereto a projecting rod 64' and the latter has pivotally connected thereto a link 65 which is connected to rock shaft 66 (see Figs. 3 and 4). Rigidly secured to the said rock shaft are a number of upwardly projecting hooked arms or latches 67, there being as many arms 67 as there are key levers. On the side of each key lever is a pin 68 which, when the key lever is in normal position, lies outside of the path of the corresponding arm 67. When, however, a given key lever is depressed its pin 68 will be carried below the corresponding arm 67, and when solenoid 64 is energized its core will be moved to the left thus rocking shaft 66 and all of the arms 67, that one of the latter which is alongside of the depressed lever engaging its pin 68 thereby preventing the return of said lever to normal position during the period that solenoid 64 remains energized. As long, therefore, as segments 61 and 62 are in contact with their respective brushes the solenoids 64 and 50 will be energized, the former locking a given key lever in its depressed position and preventing thereby the return of the bars that have been moved to their normal positions until the completion of the rotation of the commutator.

It will be noted that each of the selector bars is notched differently from the others so that no key lever will move the same combination of bars as is moved by any other lever. The notches are so arranged that each key lever will always move three bars in addition to the universal bar 45, thus closing a combination of three contacts for the necessary three impulses. When a given key lever is depressed thereby disturbing the normal relation between the selector bars, which bars are locked after they have been moved by reason of the locking of the depressed lever, it is impossible to depress any other key lever until the contacts have been restored to normal position after the impulses have been transmitted. This is by reason of the short horizontal sections along the upper edge of each bar between the notches, it being apparent that when the normal relation of the bars is disturbed by depressing a given key lever that the notches for any other key lever will be displaced relatively thereto so that any other key lever, if depressed, will strike against the upper edge of the notched bars. In addition, therefore, to the features heretofore explained this one of locking a depressed key lever closed and all of the other key levers open that is locked against depression, is of importance. From the manner of grouping the contacts 22' to 33', it is impossible to close opposite contacts at the same time. As, for example, bar 39 can close either one of the contacts 22' or 25' but not both at the same time. This avoids any possibility of short circuiting.

Upon the completion of the rotation of the armature the brushes 61' and 62', will rest upon the insulated section of the commutator thereby opening circuit 63 and deenergizing magnet 64. A spring 69 (See Fig. 4) secured to the casing and to the link 65 will then be free to act to rock the shaft 66 in a direction the reverse of that when solenoid 64 was energized thereby restoring the arms 67 to normal position, and permitting the spring 38 of the depressed lever to restore the latter to normal position. The three selector bars, now being released from engagement with a key lever, are restored to normal position by the spring arms 47' thereby opening the three contacts of the series 22' to 33' which were closed when the key lever was depressed. All of the operative parts are now in normal position and are ready for the transmission of the impulses necessary to effect the printing of the next letter or other symbol.

From the foregoing description it will be seen that the present system provides circuits which are normally open at at least two points and that a plurality of these circuits are simultaneously closed at one point and selectively closed at the other point to transmit the impulses in a pre-determined sequence; and that the complete rotation of the commutator by which the impulses are selectively transmitted is always insured regardless of the time that a given key lever remains depressed provided, however, the key lever is depressed sufficiently to start the rotation of the commutator. This I regard as one of the essential characteristics of my invention and desire to claim the same broadly without specific reference to the details of the mechanical construction involved, it being understood that by complete rotation of the commutator is meant a sufficient rotation to carry the commutator segments into contact with and past the corresponding brushes for completely closing the three selected circuits in a predetermined sequence and to position the commutator properly to transmit the impulses for the next succeeding character of the keyboard. Solenoid magnet 50 is, therefore, introduced as a means to effect the rotation of the commutator the desired distance so that the impulses shall be transmitted without interruption, and solenoid magnet 64 is introduced, not for the purpose of keeping contact 48 closed, but, for the purpose of locking a given key lever depressed thus locking the selector bars moved thereby to maintain the three contacts of the series 22' to 33' closed until the impulses have been transmitted, and incidentally, owing to the construction and disposition relatively to each other of the selector bars, to prevent any other key lever being depressed until all the impulses corresponding to a depressed lever have been transmitted. If the operator should always hold a key lever depressed long enough to keep contact 48 closed to rotate the commutator a sufficient distance to close circuit 63 through the locking magnet 64 to thereby lock the given key lever depressed, contact 48 would be held closed and there would be no necessity to introduce the commutator segment 62 and the auxiliary circuit 49'. The latter circuit is of advantage, however, in that should the commutator be accidentally rotated circuit 63 would be closed through segment 61 and brush 61' thus throwing all of the locking arms 67 into such position as to prevent the depression of any key lever thereby preventing the closing of contact 48 or any of the contacts 22' to 33'.

What I claim and desire to secure by Letters Patent is:—

1. In a transmitter, the combination of a key-board mechanism, a plurality of circuits, notched selector bars actuated directly by the key levers for simultaneously closing normally open contacts in said circuits in sets of the same number for every letter or symbol represented on the key-board, means for completely closing the selected circuits in a predetermined sequence to transmit impulses to a distant station, and means for holding said contacts closed until the impulses have been transmitted.

2. In a transmitter, the combination of a key-board mechanism, a plurality of circuits, notched selector bars actuated directly by the key levers for simultaneously closing normally open contacts in said circuits in sets of the same number for every letter or symbol represented on the key-board, a commutator for completely closing the selected circuits in a predetermined sequence to transmit impulses to a distant station, and means for holding said contacts closed until the impulses have been transmitted.

3. In a transmitter the combination of a key-board mechanism comprising means for simultaneously closing a break in a plurality of circuits, a commutator for completely closing said circuits selectively to transmit impulses in a predetermined sequence to a distant station, a magnet and means connected therewith to rotate said commutator, a normally open circuit in which said magnet is included and means for closing the same when a key lever is depressed, and means for closing an auxiliary circuit through said magnet after the rotation of the commutator has begun.

4. In a transmitter the combination of a key-board mechanism comprising means for simultaneously closing a break in a plurality of circuits, a commutator for completely closing said circuits selectively to transmit impulses in a predetermined sequence to a distant station, a magnet and means connected therewith to rotate said commutator, a circuit in which said magnet is included, means for closing a normally open contact in said circuit when a key lever is depressed, and means for closing an auxiliary circuit through said magnet after the rotation of the commutator has begun and for maintaining said auxiliary circuit closed independently of the condition of said normally open contact.

5. In a transmitter, the combination of the key levers, selector bars adapted to be moved by said levers in two directions, circuits having normally open contacts adapted to be closed by said bars when moved in either direction, and mechanism for completely closing said circuits to transmit the impulses in a predetermined sequence to a distant station.

6. In a transmitter the combination of the key levers, selector bars extending transversely thereof, said bars being cut so as to be engaged and moved by said levers and so disposed that a plurality of said bars will be moved when a given lever is depressed, circuits having normally open contacts adapted to be closed by said bars, and selective mechanism for completely closing those circuits a break in which was closed by said bars to transmit the impulses in a predetermined sequence to a distant station.

7. In a transmitter the combination of the key levers, selector bars extending transversely thereof, said bars being cut so as to be engaged and moved by said levers and so disposed that a plurality of said bars will be moved when a given lever is depressed, circuits having normally open contacts adapted to be closed by said bars, selective mechanism for completely closing those circuits a break in which was closed by said bars to transmit the impulses in a predetermined sequence to a distant station, and means for locking said bars in position to maintain the corresponding contacts closed until all the impulses have been transmitted.

8. In a transmitter, the combination of a key-board selective mechanism comprising means for closing a plurality of circuits for transmitting electric impulses in a predetermined sequence to a distant station, an electro-magnet, means actuated by the keys of the key-board when depressed to close the circuit of said magnet, and means controlled by said magnet to lock the keys in their depressed position.

9. In a transmitter, the combination of a key-board selective mechanism comprising means for closing a plurality of circuits for transmitting electric impulses in a predetermined sequence to a distant station, an electro-magnet, means actuated by the keys of the key-board when depressed to close the circuit of said magnet, and means controlled by said magnet to lock a depressed key-lever closed and the other key-levers open until the impulses have been transmitted.

10. In a transmitter the combination of the key levers, selector bars adapted to be moved by said levers, circuits having normally open contacts adapted to be closed by said bars, said circuits being so grouped that a given bar when moved in one direction will close a contact to transmit a characteristic kind of impulse and when moved in an opposite direction will close a contact to transmit a different characteristic kind of impulse.

11. In a transmitter the combination of the key levers, selector bars adapted to be moved by said levers in one direction for certain letters and in the opposite direction for others, circuits having normally open contacts adapted to be closed by said bars, the depression of any key lever simultaneously moving a plurality of said bars to close a corresponding number of said contacts, and means for completely closing said circuits in a predetermined sequence to transmit impulses to a distant station.

12. In a transmitter the combination of the key levers, selector bars adapted to be moved by said levers, said bars having notches adapted to receive the key levers so as to be moved thereby in one direction for certain letters and in an opposite direction for others and so disposed relatively to each other that at least three of said bars will be moved simultaneously by any one of said levers, circuits having normally open contacts adapted to be closed by said bars, and means for completely closing said circuits in a predetermined sequence for transmitting impulses to a distant station.

13. In a transmitter the combination of the key levers, selector bars adapted to be moved by said levers, said bars being so disposed relatively to each other that when a given key lever is depressed the normal relation is disturbed so as to prevent any other key lever being depressed.

14. In a transmitter the combination of the key levers, selector bars adapted to be moved by depressing said levers, circuits having normally open contacts adapted to be closed by said bars, means for completely closing those circuits a break in which was closed by said bars to transmit impulses in a predetermined sequence to a distant station, and means for locking a given key lever in its depressed position, said bars being so disposed relatively to each other that when a given key lever is depressed their normal relation will be disturbed so as to prevent any other key lever being depressed until all the impulses corresponding to the depressed lever have been transmitted.

15. A transmitter comprising a plurality of circuits, a commutator having segments and corresponding brushes, said circuits being divided into four groups of three each and each commutator brush connected to at least one circuit in two of said groups, means for simultaneously closing a break in one circuit of at least three of said groups, whereby impulses of different characteristics may be transmitted through a given commutator segment to a distant station, and a characteristic kind of impulse may be transmitted through a plurality of the transmitter circuits to close a given contact at the distant station according to its position in the sequence of impulses, and means for rotating the commutator to transmit the impulses in a predetermined sequence.

16. In a transmitter the combination of a keyboard mechanism comprising means for simultaneously closing a break in a plurality of circuits, a commutator for completely closing said circuits selectively to transmit impulses in a predetermined sequence to a distant station, a magnet and means actuated thereby to effect the rotation of the commutator, a normally open circuit in which said magnet is included, means for closing said last-named circuit when a key lever is depressed, an auxiliary circuit in which said magnet is also included, and means on the commutator for closing said auxiliary circuit after the rotation of the commutator has begun and for opening the same and also said normally open circuit after the impulses have been transmitted.

17. In a transmitter the combination of a keyboard mechanism comprising key levers and selector bars adapted to be moved thereby, circuits having normally open contacts adapted to be closed by said bars, a locking magnet included in a normally open circuit, means for closing the circuit of said magnet when any one of the key levers is depressed, and means actuated by said magnet when energized to lock a given key lever in its depressed position.

18. In a transmitter the combination of a keyboard mechanism comprising a universal bar adapted to be moved by all of the key levers, a commutator, a magnet and means connected therewith to effect the rotation of said commutator, a normally open circuit adapted to be closed by said universal bar and in which said magnet is included, a locking magnet the circuit of which is closed through said commutator, and mechanism actuated by said locking magnet when energized to maintain a given key lever depressed until the impulses have been transmitted.

19. In a transmitter the combination of a keyboard mechanism comprising selector bars and a universal bar, key levers to effect the movement of said bars, circuits having normally open contacts adapted to be closed by said selector bars, a commutator for completely closing the circuits a break in which was closed by the selector bars, a magnet and means connected therewith to rotate said commutator, a normally open circuit in which said magnet is included and which is adapted to be completely closed by said universal bar when any one of the key-levers is depressed, a locking magnet the circuit of which is closed through said commutator, and mechanism actuated by said locking magnet to maintain a given key lever depressed until the impulses have been transmitted.

20. In a transmitter, the combination of a keyboard mechanism comprising means for simultaneously closing contacts in a plurality of circuits, a commutator for completely closing said circuits selectively to transmit impulses in a predetermined sequence to a distant station, means for rotating said commutator, a locking magnet and means actuated thereby to maintain said contacts closed until the impulses have been transmitted, and means actuated by the keys of the key-board when depressed to close the circuit of said magnet.

21. In a transmitter, the combination of key-levers, a series of selector bars arranged transversely of and adapted to be moved by said key-levers in two directions, and circuits having normally open contacts adapted to be closed by said bars when moved in either direction.

22. In a transmitter, the combination of key-levers, a series of selector bars arranged transversely of said key-levers, said bars having notches with inclined side walls so disposed relatively to the key-levers as to be moved longitudinally in either direction when a key-lever is depressed to strike an inclined wall, and circuits having normally open contacts adapted to be closed by said bars when moved in either direction.

23. In a transmitter, the combination of a keyboard mechanism comprising means for closing contacts in a plurality of circuits, a commutator for completely closing said circuits selectively to transmit impulses in a predetermined sequence to a distant station, a magnet and means actuated thereby to rotate the commutator, means for closing the circuit of said magnet when a key is depressed, and means for maintaining the circuit closed until the commutator has made a complete revolution.

24. In a transmitter, the combination of key levers, selector bars adapted to be moved by said levers in two directions and so disposed that the same number of said bars will be moved simultaneously by any one of said levers, circuits having normally open contacts adapted to be closed by said bars moved in either direction, and means for completely closing the selected circuits in a predetermined sequence for transmitting impulses to a distant station.

25. In a transmitter, the combination of key levers, selector bars adapted to be moved by said levers longitudinally in either direction and so disposed that the same number of bars will be moved simultaneously by any one of said levers, circuits having normally open contacts adapted to be closed by said bars when moved in either direction, and means for completely closing the selected circuits in a predetermined sequence for transmitting impulses to a distant station.

26. In a transmitter, the combination of key levers, selector bars adapted to be moved longitudinally in either direction by said levers, circuits having normally open contacts, two batteries included in said circuits, each selector bar being adapted to close a contact in terminals of opposite polarity when moved by a corresponding key lever, and means for completely closing selected circuits in a predetermined sequence for transmitting impulses to a distant station.

In testimony whereof I have hereunto signed my name in the presence of two subscribing witnesses.

GEORGE A. CARDWELL.

Witnesses:
K. G. Le Ard,
G. V. Gilmore.

---

Copies of this patent may be obtained for five cents each, by addressing the "Commissioner of Patents, Washington, D. C."